United States Patent [19]

Dietz et al.

[11] Patent Number: 5,296,033
[45] Date of Patent: Mar. 22, 1994

[54] PROCESS FOR THE PRODUCTION OF PIGMENT PREPARATIONS BASED ON PHYTHALOCYANINE PIGMENTS

[75] Inventors: Erwin Dietz, Kelkheim/Taunus; Manfred Urban, Wiesbaden, both of Fed. Rep. of Germany

[73] Assignee: Hoechst Aktiengesellschaft, Frankfurt am Main, Fed. Rep. of Germany

[21] Appl. No.: 80,080

[22] Filed: Jun. 18, 1993

[30] Foreign Application Priority Data

Jun. 18, 1992 [DE] Fed. Rep. of Germany ....... 4219951

[51] Int. Cl.$^5$ ............................................. C09B 67/50
[52] U.S. Cl. ..................................... 106/412; 106/410; 106/411; 106/413; 540/122; 540/139; 540/144
[58] Field of Search ............... 106/410, 411, 412, 413; 540/122, 139, 144

[56] References Cited

U.S. PATENT DOCUMENTS

| 2,284,685 | 6/1942 | Detrick et al. | 540/122 |
| 4,056,534 | 11/1977 | Schiessler et al. | 540/141 |
| 5,062,577 | 11/1991 | Schmitt et al. | 241/171 |

Primary Examiner—Mark L. Bell
Assistant Examiner—Scott L. Hertzog

[57] ABSTRACT

Phthalocyanine pigments and phthalocyanine pigment preparations in the $\alpha$ phase and in the $\beta$ phase are prepared with phase conservation in an environmentally safe and economical manner by a) first wet milling a phthalocyanine pigment in an inert liquid medium in a stirred ball mill which is operated at a power density of more than 2.5 kill per liter of milling space and a peripheral speed of the stirrer of more than 12 m/s with exposure to a grinding medium having a diameter of less than 1 mm under phase-conserving conditions, then b) subjecting the prepigment composition obtained by a) either b1) in the form of the mill base suspension thus obtained, or b2) after addition of an organic solvent to the mill base suspension obtained by a), or b3) in the case where the prepigment intermediate or the prepigment composition intermediate is isolated, after first taking it up in an organic solvent, to a finishing treatment at elevated temperature, and c) then isolating the resulting pigment or pigment preparation.

28 Claims, 3 Drawing Sheets

PROCESS FOR THE PRODUCTION OF PIGMENT PREPARATIONS BASED ON PHYTHALOCYANINE PIGMENTS

The present invention is in the technical field of phthalocyanine pigments and relates to an environmentally safe and economical process for the production of pigment preparations based on phthalocyanine pigments of both the $\alpha$ phase and the $\beta$ phase.

Phthalocyanine pigments and pigment preparations produced therefrom have been known for a long time. Phthalocyanine pigments are prepared from the coarse-crystalline crude pigments formed in the synthesis by fine dispersion and finishing processes. Examples of fine dispersion and finishing processes are acid pasting, dry milling and wet milling processes. Combinations of these processes are also described. In order to improve purity and shade, it is in some cases necessary to purify the crude pigments before fine dispersion by dissolution in sulfuric acid and reprecipitation.

Pigment dispersing agents for the production of pigment preparations based on phthalocyanine pigments have also been known for a long time.

U.S. Pat. No. 2,526,345 describes the production of pigment preparations based on sulfo-containing phthalocyanine compounds. U.S. Pat. No. 3,028,392 describes the production of pigment preparations based on carboxyl-containing copper phthalocyanine compounds.

U.S. Pat. No. 2,861,005 describes the production of pigment preparations based on sulfonamido-containing copper phthalocyanine compounds.

GB-A 949 739 describes the production of pigment preparations based on methylamino-containing phthalocyanine compounds. U.S. Pat. No. 2,855,403 describes the production of pigment preparations based on phthalocyanine compounds containing phthalimidomethylene groups. Conversion of the coarse-crystalline crude pigments into the pigment form is described in the publications listed below:

GB-A 1,502,684 describes a wet milling process for the production of pigment preparation based on phthalocyanine pigments of the $\beta$ phase by solvent milling of purified phthalocyanine crude pigments in the presence of pigment dispersing agents. Owing to the extremely long milling times and the high losses in solvent during milling, this process is uneconomical and ecologically unsafe. Furthermore, the coloristic properties no longer meet the present-day expectations of fast pigments.

U.S. Pat. No. 2,816,115 describes the preparation of copper phthalocyanine pigments of the P phase by aqueous bead milling in the presence of surface-active substances. However, the pigments obtained do not fulfil the requirements demanded in today's practice of pigments having excellent fastness properties.

U.S. Pat. No. 3,775,149 describes a wet milling process of coarse-crystalline copper phthalocyanine crude pigments in a roll or bead mill in the presence of 5 to 10% of surface-active substances. Owing to the extremely long milling times, this process is uneconomical. With respect to the coloristic properties, these pigments no longer fulfil the requirements demanded in today's practice of pigments having excellent fastness properties.

U.S. Pat. No. 4,024,154 describes a two-step dry and wet milling process for the preparation of copper phthalocyanine pigments. In this process, the coarse-crystalline crude pigment is premilled in dry form in a roll mill and then subjected to aqueous milling in a roll mill in the presence of small amounts of an aliphatic hydrocarbon. Owing to the extremely long milling times during dry milling and during wet milling, this process is uneconomical. Furthermore, this patent describes that no useful pigments having high-quality coloristic properties can be produced by aqueous milling alone.

GB-A 1,091,906 describes the preparation of phthalocyanine pigments by wet milling of crude phthalocyanines in dilute organic acids. This results in the formation of large amounts of organic acids in dilute form which have to be reprocessed. For this reason, this process is also uneconomical. According to the details given in this patent, no utilizable pigments can be prepared by milling in water using a fine grinding medium, such as pebbles, sand or beads.

The object of the present invention was to provide a process for the production of phthalocyanine pigments or of a phthalocyanine pigment preparation which avoids the abovementioned disadvantages and provides the pigments mentioned with conservation of the $\alpha$ phase or $\beta$ phase in such a form that pigment preparations having excellent rheological and coloristic properties can be produced therefrom.

This object was achieved by wet milling the coarse-crystalline phthalocyanine crude pigments formed in the synthesis or purified with sulfuric acid after the synthesis in an aqueous, aqueous-organic or organic medium in a stirred ball mill having a high density of energy and containing a fine grinding medium until a specific minimum degree of fine dispersion of the resulting pigment particles under phase-conserving conditions is reached and then subjecting the mill base suspensions obtained directly or, in the case where the intermediate is isolated, after taking it up again in an inert liquid, preferably in the presence of organic solvents, to a customary finishing treatment at elevated temperature, the pigment dispersing agents of the formula (I) defined below being added in a preferred embodiment before or during wet milling, during or after the finishing treatment or in both treatment steps mentioned.

The present invention relates to a process for the production of a phthalocyanine pigment or a pigment preparation based on a phthalocynanine pigment, which comprises a) first wet milling a phthalocyanine pigment in an inert liquid medium in a stirred ball mill which is operated at a power density of more than 2.5 kW per liter of milling space and a peripheral speed of the stirrer of more than 12 m/s with exposure to a grinding medium having a diameter of less than 1 mm under phase-conserving conditions, then b) subjecting the prepigment composition obtained by a) either b1) in the form of the mill base suspension thus obtained, or b2) after addition of an organic solvent to the mill base suspension obtained by a), or b3) in the case where the prepigment intermediate or the prepigment composition intermediate is isolated, after first taking it up in an organic solvent, to a finishing treatment at elevated temperature, and c) then isolating the resulting pigment or pigment preparation.

Isolating is usually understood to mean the distilling off of the solvent, filtering and washing the press cake and then drying and milling the pigment or the pigment preparation.

In a preferred embodiment of the process according to the invention, there is added one or more times, before, during or after one or more of the individual steps a), b) and c), at least one pigment dispersing agent of the formula (I),

 (I)

in which

P is an m-valent radical based on the formula (II)

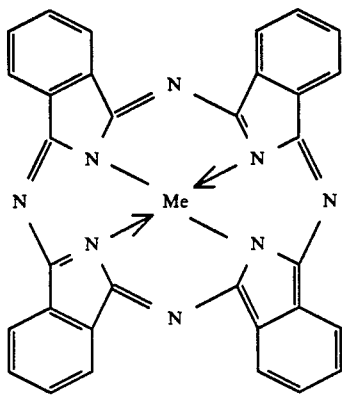 (II)

in which
m is from 1 to 6,
Me is two hydrogen atoms or a divalent metal atom, preferably a copper, iron, zinc, nickel, cobalt or tin atom, in particular a copper atom, and
X is a group of the formula (IIIa)

 (IIIa)

or a group of the formula (IIIb)

 (IIIb)

in which M is a hydrogen atom or an equivalent of an alkali metal ion, alkaline earth metal ion or ammonium ion or in which
X is a group of the formula (IIIc)

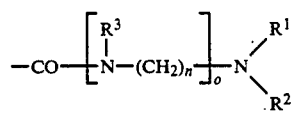 (IIIc)

or a group of the formula (IIId)

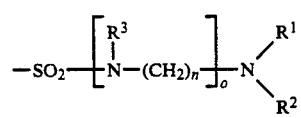 (IIId)

in which $R^1$ and $R^2$ are identical or different and are a hydrogen atom, a $C_1$-$C_{20}$-alkyl, $C_2$-$C_{20}$-alkenyl group or a $C_5$-$C_7$-cycloalkyl group, preferably a hydrogen atom, a methyl or ethyl group or in which $R^1$ and $R^2$ together with the adjacent nitrogen atom form an aliphatic or aromatic, five- to seven-membered heterocyclic system having in each case 1 to 3 identical or different heteroatoms belonging to the ring from the series comprising nitrogen, oxygen or sulfur, preferably imidazole, piperidine, piperazine, pyrrolidine, morpholine, imidazoline or hexamethyleneimine;

$R^3$ is a hydrogen atom or a $C_1$-$C_4$-alkyl group, preferably a hydrogen atom or a methyl group, n is from 1 to 6, preferably 2 or 3, o is 0 or 1, preferably 1, and m is from 1 to 4, or in which X is an aminomethylene group of the formula (IIIe)

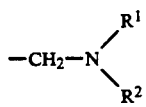 (IIIe)

in which $R^1$ and $R^2$ have the abovementioned meaning and m is from 1 to 6, or in which X is a group of the formula (IIIf)

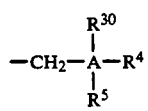 (IIIf)

in which A is a five- or six-membered aromatic ring or a fused aromatic heterocycle containing 1 to 3 identical or different heteroatoms from the series comprising nitrogen, oxygen or sulfur and the heterocycle is bound to the methylene group via a carbon atom, $R^{30}$ and $R^4$ are a hydrogen atom a $C_1$-$C_4$-alkyl, $C_1$-$C_4$-hydroxyalkyl or a $C_2$-$C_4$-alkenyl group, preferably a hydrogen atom, $CH_3$, $C_2H_5$ or $C_2H_4OH$, or an aryl group, aryl being phenyl which is unsubstituted or substituted by 1 to 4 radicals from the group comprising $C_1$-$C_6$-alkyl, halogen, preferably F, Cl or Br, $C_1$-$C_6$-alkoxy, cyano, $CONH_2$ and $COOR^{12}$, $R^{12}$ being hydrogen or $C_1$-$C_6$-alkyl, $R^{30}$ and $R^4$ together can also form an aliphatic or aromatic ring, preferably a phenyl ring, $R^5$ is a hydrogen atom, a $C_1$-$C_4$-alkyl, a $C_1$-$C_3$ or a $C_2$-$C_4$-alkenyl group and m is from 1 to 4, or in which X is a group of the formula (IIIg)

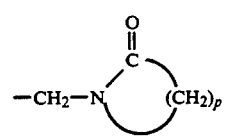 (IIIg)

p being from 3 to 6, preferably 3 to 5, and m being from 1 to 4, or in which

X is a phthalimidomethylene group of the formula (IIIh)

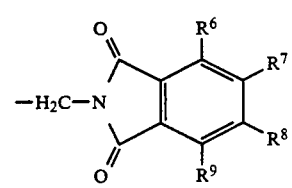 (IIIh)

in which $R^6$, $R^8$ and $R^9$ are identical or different and are a hydrogen, fluorine, chlorine or bromine atom, preferably a hydrogen atom, $R^7$ is a hydrogen, fluorine, chlorine or bromine atom or a nitro, $C_1$-$C_5$-alkyl, $C_1$-$C_6$-alkoxy or benzoylamino group, preferably a hydrogen atom, and m is from 1 to 4, or in which X is an o-sulfobenzimidomethylene group of the formula (IIIi)

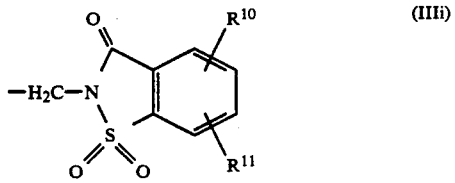

in which $R^{10}$ and $R^{11}$ are identical or different and are a hydrogen, chlorine or bromine atom or a $C_1$-$C_4$-alkyl, $C_1$-$C_4$-alkoxy or a nitro group, preferably a hydrogen atom, and
m is from 1 to 4, or in which
X is a group of the formula (IIIk)

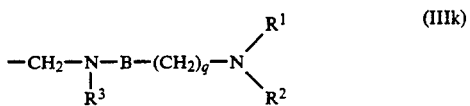

in which B is a carbonyl or sulfonyl group, preferably a carbonyl group, and $R^1$, $R^2$ and $R^3$ have the abovementioned meaning,
q is the number 1 or 2, preferably 1, and
m is from 1 to 4,
or there is added at least one pigment dispersing agent of the formula (I) containing variants of the abovementioned radicals X in one molecule.

The process according to the invention for the production of these phthalocyanine pigments or pigment preparations requires high milling efficiency, which is achieved by using a specific design of the stirred ball mill in combination with maintaining phase-conserving milling and finishing conditions. Stirred ball mills which are suitable for milling of the desired efficiency are those which are designed for batchwise and continuous operation, have a horizontally or vertically constructed milling space in the form of a cylinder or hollow cylinder and can be operated at a specific power density of more than 2.5 kW per liter of milling space and whose peripheral speed of the stirrer is more than 12 m/s. Mills of this type are described, for example, in U.S. Pat. No. 5,062,577. The energy released by the stirrer per unit of time is transferred to the mill base as size reduction work and as energy of friction in the form of heat. In order to allow problem-free delivery of this large amount of heat, the ratio of milling space to surface area of the milling space (cooling area) must be minimized by the construction. This ratio should be less than 0.15:1 ($dm^3$:$dm^2$).

Examples of the grinding medium are balls made of zirconium oxide, zirconium mixed oxide, alumina or quartz having a diameter of less than 1 mm; advantageously, the grinding medium used has a diameter of 0.2 to 1 mm, preferably 0.3 to 0.5 mm.

If continuous stirred ball mills are used for fine dispersion, the grinding medium is preferably separated off from the mill base by centrifugation, so that the separation devices virtually do not come into contact with the grinding medium, thus substantially avoiding clogging of the separation devices. The stirred ball mills are operated at a high grinding medium filling ratio. In continuous stirred ball mills, the milling space is virtually completely filled with grinding medium.

Advantageously, the pigments used for milling are the crude pigments obtainable in the synthesis, for example according to GB-A 1,422,834, and U.S. Pat. No. 2,964,532, or the highly crystalline crude pigments of the α phase or β phase obtained after purification with sulfuric acid according to GB-A 1,502,884 or U.S. Pat. No. 2,284,685, which pigments may still contain small amounts, i.e. up to 5 mol % of sulfo or carboxyl groups, and highly crystalline halogenated crude pigments according to U.S. Pat. No. 2,247,752. The crude pigments used are predominantly, i.e. more than 90%, preferably more than 94% thereof, in the α phase or β phase. In the milling process according to step a), the phase of the phthalocyanine pigments used is very substantially maintained. After milling, the pigments are present as finely divided pigments.

Depending on the physical state of the crude pigment, it may be necessary to add small amounts of solvent and/or surface-active agents for phase conservation. Preliminary experiments are necessary for determining suitable milling conditions. Purity, crystal size, crystal quality and possible formations, of mixed crystals are decisive for the physical state of the crude pigment. In general, pure and highly crystalline crude pigments have to be milled for a longer period than contaminated pigments and those exhibiting defects in the crystal lattice. Milling is preferably carried out in an aqueous medium or, if necessary for phase conservation, in an aqueous medium with the addition of small amounts of an organic solvent, preferably up to 10% by weight, relative to the entire mill base, in a homogeneous mixture. It is also possible to carry out milling in an organic medium. Preferably, milling is carried out in an alkaline or neutral pH range.

The pigment concentration in the mill base depends on the rheology of the suspension and is advantageously at most 40% by weight, preferably 10 to 35% by weight, in particular 10 to 20% by weight, relative to the mill base suspension.

Suitable organic solvents to be added advantageously to the mill base suspension are: water-miscible $C_1$-$C_8$-alkanols, such as methanol, ethanol, n-propanol, isopropanol, n-butanol, tert.-butanol, isobutanol, pentanol, hexanol or alkylhexanols; cyclic alkanols, such as cyclohexanol; $C_1$-$C_5$-dialkyl ketones, such as acetone, diethyl ketone, methyl isobutyl ketone or methyl ethyl ketone; ether and glycol ethers, such as tetrahydrofuran, dimethoxyethane, methylglycol, ethylglycol, butylglycol, ethyldiglycol, methoxypropanol or methoxybutanol; amides of aliphatic acids, such as formamide or dimethylformamide; amides of cyclic carboxylic acids, such as N-methylpyrrolidone, valero- or caprolactam; heterocyclic bases, such as pyridine, morpholine or picoline; and dimethyl sulfoxide or mixtures of these solvents with water.

Water and solutions of $C_1$-$C_6$-alkanols in water, in particular a solution of isobutanol in water, are particularly preferred for milling. For pigments of the β phase, aromatic solvents, for example aromatic hydrocarbons, such as toluene, xylenes or ethylbenzene; aromatic halogenated hydrocarbons, such as chlorobenzene, o- dichlorobenzene, 1,2,4-trichlorobenzene or bromobenzene and substituted aromatics, such as nitrobenzene or phenol, are also suitable. Milling of pigments of the $\alpha$ phase should be performed in the absence of aromatic solvents. In this case, milling in the presence of water only is preferred.

Milling is carried out at temperatures in the range from 0° to 100° C., advantageously at a temperature of between 10° and 60° C., preferably at 20° to 50° C.

The phase-conserving conditions described above have the effect that phthalocyanine crude pigments which are predominantly present in the $\alpha$ phase give, after milling and finishing, finely divided pigments predominantly in the $\alpha$ phase and that phthalocyanine crude pigments which are predominantly present in the $\beta$ phase give, after milling and finishing, finely divided pigments predominantly in the $\beta$ phase.

The mill base can, apart from the abovementioned components, also contain further customary additives, for example cationic, anionic or nonionic surfactants, preferably fatty alcohol polyglycol ethers, alkylphenol polyglycol ethers, alkanesulfonic acids and their salts, alkylphenylsulfonic acids and their salts and alkylphenol polyglycol ether sulfates, rheologically active additives, antifoams and extenders.

The milling time depends on the required fineness for the particular field of work, for example the paints, printing or plastics sector. The residence time of the mill base in the stirred ball mill is in general, depending on the required fineness, between 5 and 60 minutes. A time of 5 to 45 minutes, preferably 10 to 30 minutes, has proven to be advantageous.

Addition of the pigment dispersing agents of the formula (I) can take place all at once or in several portions. Addition can take place before, during or after milling a), during or after the finishing treatment b) or during or after isolation c), in the last-mentioned case also by dry mixing. The best time for this must be determined in advance by preliminary experiments. Preferably, addition of the pigment dispersing agents takes place after milling immediately before the solvent finish.

Particular preference is given to pigment dispersing agents of the formula (I) in which X is a sulfonamide group of the formula (IIId), a phthalimidomethylene group of the formula (IIIh), an imidazolylmethylene group of the formula (IIIf) or an o-sulfobenzimidomethylene group of the formula (IIIi).

Depending on the size of the specific surface area of the phthalocyanine pigment to be dispersed, the pigment dispersing agents according to the invention are added in amounts of 0.1 to 25% by weight, preferably 1 to 15% by weight, in particular 3 to 12% by weight, relative to the phthalocyanine pigment used. Mixtures of different pigment dispersing agents of the formula (I) also achieve the object of the present invention.

The finely divided prepigment compositions present after milling are subjected, where appropriate after addition of the pigment dispersing agents of the formula (I), to heat treatment (solvent finish) in aqueous suspension or, preferably, after admixing organic solvents. It is also possible to dry the prepigment composition and to subject it in anhydrous form to a solvent finish in one or more of the solvents mentioned below.

Examples of suitable solvents for a finish are: alicyclic hydrocarbons, such as cyclohexane; $C_1-C_8$-alkanols and alicyclic alcohols, such as methanol, ethanol, n- or isopropanol, n-, iso- or tert.-butanol, pentanols, hexanols, cyclohexanol; $C_1-C_5$-dialkyl ketones or cyclic ketones, such as acetone, diethyl ketone, methyl isobutyl ketone, methyl ethyl ketone or cyclohexanone; ethers and glycol ethers, such as dimethoxyethane; tetrahydrofuran; ethylene glycol monomethyl or monoethyl ether or propylene glycol monomethyl or monoethyl ether, butylglycol, ethyldiglycol or methoxybutanol; aliphatic carboxylates, such as formamide or dimethylformamide; cyclic carboxylates, such as N-methylpyrrolidone; $C_1-C_4$-alkyl carboxylates, such as butyl formamide, ethyl acetate or propyl propionate; $C_1-C_4$-glycol carboxylates, and dimethyl sulfoxide and sulfolane or mixtures of the abovementioned solvents. For pigments of the $\beta$ phase, aromatic solvents, for example aromatic hydrocarbons, such as toluene, xylenes or ethylbenzene; aromatic halogenated hydrocarbons, such as chlorobenzene, o-dichlorobenzene, 1,2,4-trichlorobenzene or bromobenzene; substituted aromatics, such as nitrobenzene or phenol, $C_1-C_4$-alkyl phthalate and benzoate, such as ethyl benzoate; heterocyclic bases, such as pyridine, morpholine or picoline are also suitable. Preferred organic solvents are $C_1-C_6$-alkanols, in particular ethanol, propanols, butanols and pentanols, particular preferably butanols, and ketones, in particular acetone.

The conditions to be maintained when carrying out the solvent finish are highly dependent on the desired properties of the pigment preparation and are in each case adjusted thereto. Usually, the suspension of the prepigment composition in the inert liquid medium of process step a) is treated at a temperature in the range of between 50° and 200° C., under atmospheric pressure or under elevated pressure, for 1 to 24 hours. In general, the suspension obtained after wet milling is used for this purpose without first isolating the mill base. However, it is also possible to add the abovementioned solvents, it being possible for the amount of solvent added to vary within wide limits. Preferably, the same amount by weight of solvent up to 5 times this amount, relative to the weight of the prepigment composition, is used. The heat treatment in the aqueous-organic medium is preferably carried out at 50° to 150° C. for a period of 1 to 6 hours. After finishing is complete, the solvents used therefor are recovered and used again.

By selecting the organic solvent, its concentration, the temperature and the duration of the finishing treatment, it is possible to produce, depending on the intended use, phthalocyanine pigment preparations which have either higher transparency or higher hiding power.

The production of pigment preparations based on copper phthalocyanines by the process according to the invention has proven to be particularly economical and environmentally safe since the fine dispersion of the crude pigments by wet milling does not give rise to air pollution as a result of dust formation. Furthermore, only small amounts of the abovementioned additives and solvents are used, which are then further processed or can be completely regenerated so that no waste disposal problems arise.

The pigment preparations obtainable by the present invention are distinguished by their excellent coloristic and rheological properties, in particular resistance to flocculation, dispersibility, rheology, gloss characteristics, and color strength.

The present invention furthermore relates to pigment preparations obtainable by the process according to the invention described above.

The pigment preparations produced according to the invention can be used for the pigmenting of high-molecular-weight organic materials of natural or synthetic origin: Examples of high-molecular-weight organic materials which can be pigmented with the pigment preparations mentioned are cellulose ethers and cellulose esters, such as ethylcellulose, nitrocellulose, cellulose acetate or cellulose butyrate, natural resins or synthetic resins, such as polymerization resins or condensation resins, for example amino resins, in particular urea/and melamine/formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures.

It is of no importance whether the high-molecular-weight organic compounds mentioned are present as plastic compositions, melts or in the form of spinning solutions, paints, coating compositions or printing inks. Depending on the intended use, it may be advantageous to use the pigment preparations obtained according to the invention as toners or in the form of preparations or dispersions. Pigment preparations produced according to the invention are used in an amount of 0.1 to 10% by weight, relative to the high-molecular-weight organic material to be pigmented.

Particularly preferred coating systems are the novel, aqueous paints and the low-solvent high-solid paints of high solids content. Customary coating systems from the class comprising alkyd/melamine varnishes and two-component finishes based on alkyd and acrylic resins crosslinkable with polyisocyanate are also suitable.

Pigment preparations produced according to the invention are readily dispersible in many application media and to a high degree of fineness. Such pigment dispersions have high resistance to flocculation and exhibit excellent rheological properties even when highly pigmented. They provide coatings and prints of high color strength, high gloss and high transparency and excellent fastness properties.

In order to evaluate the properties of the pigment preparations produced according to the invention in the coating sector, an alkyd/melamine (AM) varnish containing aromatics and based on a medium-oil, non-drying alkyd resin obtained from synthetic fatty acids and phthalic anhydride and a melamine resin etherified with butanol and portions of a non-drying alkyd resin based on ricinoleic acid (short-oil) a high-solid acrylic baking enamel based on a non-aqueous dispersion (TSA) and an aqueous varnish based on polyurethane (PUR) were selected from the multiplicity of known varnishes.

In order to evaluate the pigment preparations produced by the present invention in the plastics sector, plasticized polyvinyl chloride (PVC) was selected from the multiplicity of known plastics.

In order to evaluate the properties of the pigment preparations produced by the present invention in printing technology, a gravure printing system based on nitrocellulose (NC) was selected from the multiplicity of known printing systems.

Color strength and shade were determined according to DIN 55986. The rheology of the mill base after dispersion was scored against the following five-step scale:
5 thin liquid
4 liquid
3 viscous liquid
2 slightly solid
1 solidified After diluting the mill base to the final pigment concentration, the viscosity was evaluated using a Rossmann viscous batch, type 301, from Erichsen, Iserlohn.

Gloss measurements were carried out on cast films at an angle of 20° by DIN 67 530 (ASTMD 523) using the "multigloss" meter from Byk-Mallinckrodt, Wesel.

The pigment content of the phthalocyanine crude pigments was determined by dissolution in concentrated sulfuric acid and reprecipitation.

The crystal phase of the crude pigments, pigments and pigment preparations was determined by x-ray spectroscopy. The x-ray spectra were recorded using Cu $K_\alpha$ radiation.

The crystal phase of the pigments and pigment preparations in the application media was determined by spectralphotometry.

In the examples which follow, parts and percentages of the substances described are by weight.

EXAMPLE 1

A suspension comprising 85 parts of 5% aqueous isobutanol and 15 parts of coarse-crystalline copper phthalocyanine crude pigment ($\beta$ phase, 95.5% pure) is metered into a stirred ball mill of the design described in U.S. Pat. No. 5,062,577 which is filled with 336 parts of zirconium mixed oxide beads 0.3 to 0.4 mm in diameter as a grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with 210 parts of water, and the mill base suspensions are combined.

1.5 parts of the pigment dispersing agent of the formula (I) are added to the combined mill base suspension as a 16.0% water-moist press cake. In formula (I), P is the radical given in formula (II), in which Me is a copper atom and in which X is the phthalimidomethylene group of the formula (IIIh), in which $R^6$, $R^7$, $R^8$ and $R^9$ are each a hydrogen atom and m is the number 1.0. 45 parts of isobutanol (100% pure) are then added, and the mixture is stirred at 25° C. for 24 hours. It is heated to boiling, stirred at a boiling temperature for 3 hours, and the isobutanol is then distilled off azeotropically by heating to up to 100° C. at the head. After cooling to 60° C., the pigment preparation is filtered off with suction, washed with water and dried at 800° C.

This gives 14.9 parts of pigment preparation ($\beta$ phase), which on incorporation in AM varnish produces coatings of high color strength. The rheology is given a rating of 3. The viscosity is 5.9 s, and the gloss measurement gives a value of 88. Incorporation in PUR varnish likewise gives coatings of high color strength. The rheology is given a rating of 5.

When used in nitrocellulose gravure printing, glossy prints of high color strength are obtained.

EXAMPLE 2

Figure 3:
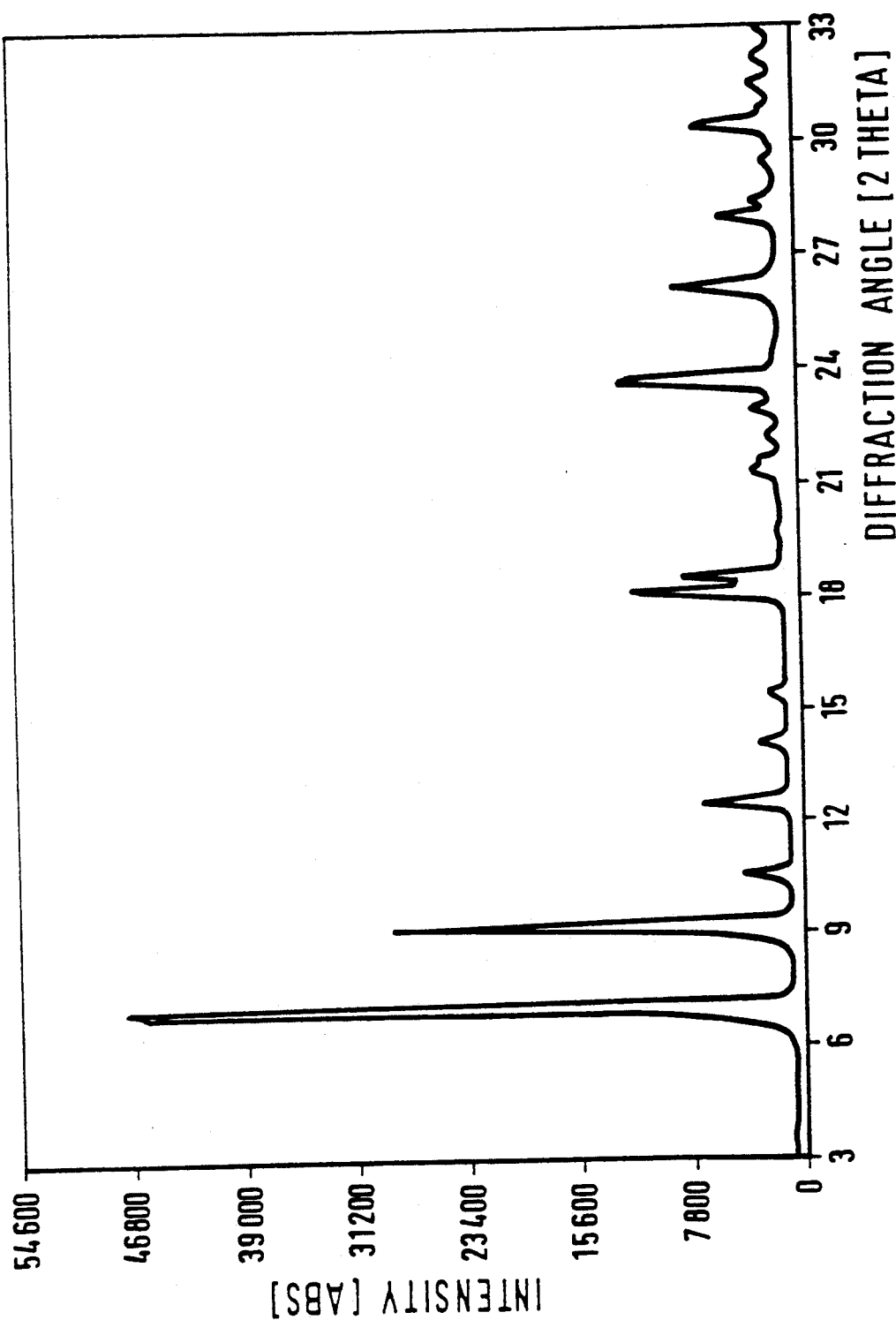
FIG. 3 shows the x-ray diffraction diagram of a coarse-crystalline copper phthalocyanine crude pigment, 95.5% of which is present in the $\beta$ phase.

A suspension comprising 85 parts of 5% aqueous isobutanol and 15 parts of coarse-crystalline copper phthalocyanine crude pigment ($\beta$ phase, 95.5% pure, see FIG. 3) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is then milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) is added as a 16.0% water-moist press cake. In formula (I), P is the radical given in formula (II), in which Me is a copper atom and in which X is the phthalimidomethylene group of the formula (IIIh), in which $R^6$, $R^7$, $R^8$ and $R^9$ are each a hydrogen atom and m is the number 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

Figure 1:
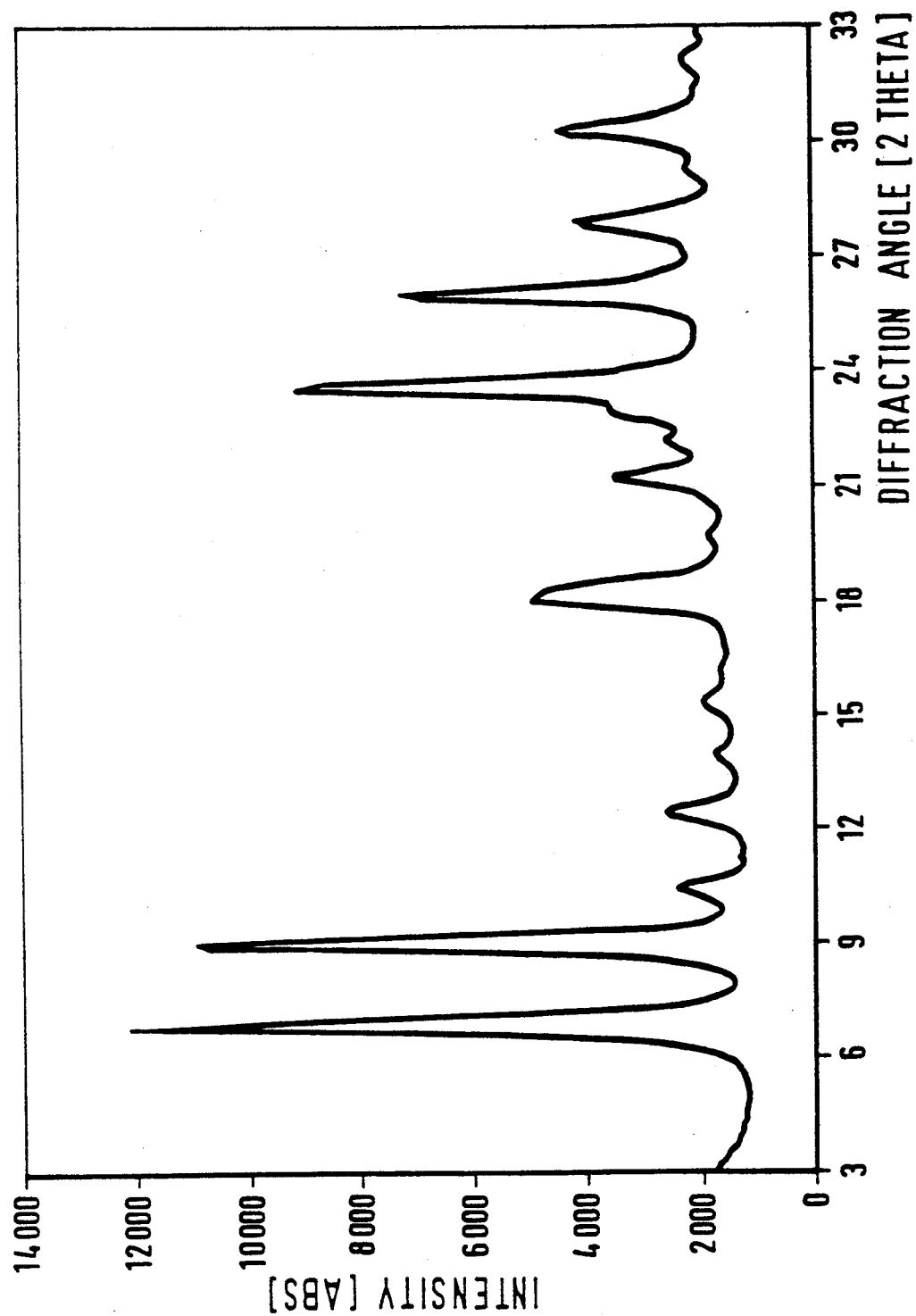
FIG. 1 shows the x-ray diffraction diagram of a copper phthalocyanine pigment preparation in the phase obtained by Example 2 of the present invention.

This gives 15.9 parts of pigment preparation ($\beta$ phase, see FIG. 1), which on incorporation in AM varnish produces coatings of high color strength. The rheology is given a rating of 3 to 4. The viscosity is 3.4 s, and the gloss measurement gives a value of 86. When used in offset printing, prints of high transparency and color strength are obtained. Flowability of the printing ink is very good.

COMPARATIVE EXAMPLE 2a

If the crude pigment used in Example 2 is milled in a bead mill, for example of the ®Moulinex type from Netzsch, Selb/Bavaria, according to GB-A 1,502,884, the mill base having the composition mentioned above, for 0.5 hours and then finished as above, a pigment preparation is obtained which on incorporation in AM varnish has 35% lower color strength and is significantly duller than the pigment preparation produced according to the invention.

COMPARATIVE EXAMPLE 2b

If milling is carried out in a bead mill, for example of the ®Moulinex type from Netzsch, Selb/Bavaria, and extended to 2 hours, the pigment preparation on incorporation in AM varnish still has an 18% lower color strength and is significantly duller than the pigment preparation according to the invention.

COMPARATIVE EXAMPLE 2c

If the crude pigment used in Example 2 is milled in a bead mill equipped with disk stirrer of the design according to U.S. Pat. No. 2,816,115 together with quartz beads 1 mm in diameter at a peripheral speed of the stirrer of 10.2 m/s and a specific power density of 0.45 kW per liter of milling space, the mill base composition being as in Example 2, and then finished as in Example 2, a pigment preparation is obtained which on incorporation of AM varnish has a 36% lower color strength and is significantly duller than the pigment preparation produced according to the invention.

COMPARATIVE EXAMPLE 2d

If the crude pigment used in Example 2 is milled under the milling conditions described in US Patent 3,775,149, Example 25 (bead mill equipped with disk stirrer, quartz beads 1.0 mm in diameter), for 12 hours and then worked up, a pigment is obtained which has a 25% lower color strength and is significantly duller than the pigment preparation produced according to the invention.

EXAMPLE 3

A suspension comprising 80 parts of water, 4.25 parts of isobutanol (100% pure), 0.85 part of sodium hydroxide (99% pure) and 15 parts of coarse-crystalline copper phthalocyanine crude pigment ($\beta$ phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, the combined mill base suspensions are filtered off with suction, and the filter cake is washed neutral with water.

For the finishing operation, the press cake obtained on the filter is taken up in 120 parts of water, and 1.5 parts of the pigment dispersing agent of the formula (I) is added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 14.5 parts of pigment preparation ($\beta$ phase see FIG. 1) which on incorporation in AM varnish produces coatings of high color strength. The rheology is given a rating of 3. The viscosity is 6.4 s, and the gloss measurement gives a value of 87.

Incorporation in PUR varnish likewise gives coatings of high color strength. The rheology is given a rating of 5.

EXAMPLE 4

A suspension comprising 85 parts of 5% aqueous isobutanol and 15 parts of coarse-crystalline copper phthalocyanine crude pigment ($\beta$ phase 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the filter cake is taken up in 120 parts of water, and 0.75 part of the pigment dispersing agent of the formula (I) in which P is the radical given in formula (II) and in which Me is a copper atom, X is an o-sulfobenzimidomethylene group of the formula (IIIi), $R^{10}$ and $R^{11}$ are each a hydrogen atom and m is the number 1.0 and which still contains 50% of unsubstituted copper phthalocyanine, is added as a 19.4% water-moist press cake. 45 parts of isobutanol (100% pure) are then added and the mixture is stirred at 25° C. for 24 hours. The mixture is heated to boiling point, stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 15.0 parts of a pigment preparation ($\beta$ phase) which on incorporation in plastic (PVC) gives colorations of high color strength and excellent bleeding fastness.

EXAMPLE 5

A suspension comprising 85 parts of 5% aqueous isobutanol, 15 parts of coarse-crystalline copper phthalocyanine crude pigment (o phase, 95.5% pure) and 1.5 parts of the pigment dispersing agent of the formula (I) in which P is the radical given in formula (II), Me is a copper atom and X is an o-sulfobenzimidomethylene group of the formula (IIIi) in which $R^{10}$ and $R^{11}$ are each a hydrogen atom and m is the number 1.0 and which still contains 50% of unsubstituted copper phthalocyanine, as 19.4% water-moist press cake is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. at a peripheral speed of the stirrer of 15.6 m/s and a specific power density of 3.1 kW per liter of milling space. The mill base suspension is then separated off from the grinding medium, the grinding medium is rinsed with water, and the combined mill base suspensions are filtered off with suction.

For the finishing operation, the filter cake is taken up in 120 parts of water, 45 parts of isobutanol (100% pure) are then added, and the mixture is additionally stirred at 25° C. for 24 hours. It is heated to boiling point, stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 14.9 parts of pigment preparation ($\beta$ phase) which on incorporation in PUR varnish gives coatings of high color strength. The rheology is given a rating of 5.

EXAMPLE 6

A suspension comprising 85 parts of 5% aqueous isobutanol and 15.8 parts of coarse-crystalline copper phthalocyanine crude pigment (o phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s for 30 minutes. The mill base suspension is then separated off from the grinding medium, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 15.6 parts of pigment preparation ($\beta$ phase, containing traces of a phase) which on incorporation in AM varnish produces transparent coatings of high color strength. The rheology is given a rating of 1 to 2. The viscosity is 4.4 s, and the gloss measurement gives a value of 88.

EXAMPLE 7

A suspension comprising 90 parts of 5% aqueous isobutanol and 10 parts of coarse-crystalline copper phthalocyanine crude pigment ($\beta$ phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 10 minutes. The mill base suspension is then separated from the grinding medium by screening, the grinding medium is rinsed with water, and the combined mill base suspensions are filtered off with suction.

For the finishing operation, the press cake obtained on the filter is taken up in 80 parts of water, and 1.0 part of the pigment dispersing agent of the formula (I) is added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 1.0. 5 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 10.5 parts of pigment preparation ($\beta$ phase) which on incorporation in AM varnish produces coatings of high color strength.

EXAMPLE 8

A suspension comprising 85 parts of 5% aqueous n-butanol and 15 parts of coarse-crystalline copper phthalocyanine crude pigment ($\beta$ phase, 99.0% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 1.0. 45 parts of n-butanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 800° C.

This gives 16.1 parts of pigment preparation ($\beta$ phase) which on incorporation with AM varnish produces coatings of high color strength.

EXAMPLE 9

A suspension comprising 85 parts of 5% aqueous isobutanol and 15 parts of coarse-crystalline copper phthalocyanine crude pigment ($\beta$ phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^6$, $R^8$ and $R^9$ are each a hydrogen atom and m is the number 2.6. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 15.9 parts of pigment preparation ($\beta$ phase) which on incorporation in AM varnish produces coatings of high color strength.

EXAMPLE 10

A suspension comprising 85 parts of 5% aqueous isobutanol and 15 parts of coarse-crystalline copper phthalocyanine crude pigment ($\beta$ phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 15.0% water-moist press cake. In formula (I), P is the radical given in formula (II) in which Me is a copper atom and in which X is a group of the formula (IIIf) in which A is an imidazolyl radical, $R^{30}$ is a methyl group, $R^4$ and $R^5$ are each a hydrogen atom and m is the number 1.0. The pigment dispersing agent still contains 40% of unsubstituted copper phthalocyanine. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 800° C.

This gives 15.4 parts of pigment preparation ($\beta$ phase) which on incorporation in AM and TSA varnish produces coatings of high color strength.

EXAMPLE 11

A suspension comprising 85 parts of 5% aqueous isobutanol and 15 parts of coarse-crystalline copper phthalocyanine crude pigment ($\beta$ phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is then milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as an 11.4% water-moist press cake. In formula (I), P is the radical given in formula (II) in which Me is a copper atom and in which X is a lactam methylene group of the formula (IIIg) in which p is the number 5.0 and m is the number 3.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 16. 0 parts of pigment preparation ($\beta$ phase) which on incorporation in AM varnish produces coatings of high color strength.

EXAMPLE 12

A suspension comprising 85 parts of 5% aqueous isobutanol and 15 parts of coarse-crystalline copper phthalocyanine crude pigment ($\beta$ phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is then milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 53.0% water-moist press cake. In formula (I), P is the radical given in formula (II) in which Me is a copper atom and in which X is a sulfonamido group of the formula (IIId) in which o is the number 0, $R^1$ is a hydrogen atom, $R^2$ is an oleyl group and m is the number 3.7. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 16.1 parts of pigment preparations (β phase) which on incorporation in AM varnish produces coatings of high color strength.

EXAMPLE 13

A suspension comprising 85 parts of 5% aqueous isobutanol and 15 parts of coarse-crystalline copper phthalocyanine crude pigment (β phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, and the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 46.3% water-moist press cake. In formula (I), P is the radical given in formula (II) in which Me is a copper atom and in which X is a sulfonamido group of the formula (IIId) in which $R^3$ is a hydrogen atom, $R^1$ and $R^2$ are each an ethyl group and in which n is the number 3.0, o is the number 1.0 and m is the number 3.7. 45 parts of isobutanol (100% pure) are then added, the mixture is stirred at the boiling temperature for 3 hours, and the isobutanol is then distilled off by heating to up to 100° C. at the head. After cooling to 60° C., the pigment preparation is filtered off with suction, washed with water and dried at 80° C.

This gives 15.1 parts of pigment preparation (β phase) which on incorporation in AM varnish produces coatings of high color strength.

EXAMPLE 14

A suspension comprising 85 parts of 5% aqueous isobutanol and 15 parts of coarse-crystalline copper phthalocyanine crude pigment (β phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 2.6. 45 parts of cyclohexane are then added, the mixture is stirred at the boiling temperature for 3 hours, and the cyclohexane is then distilled off by heating to up to 100° C. at the head. After cooling to 60° C., the pigment preparation is filtered off with suction, washed with water and dried at 80° C.

This gives 15.7 parts of pigment preparation (β phase) which on incorporation in AM varnish produces coatings of high color strength.

EXAMPLE 15

A suspension comprising 85 parts of 5% aqueous isobutanol and 15 parts of coarse-crystalline copper phthalocyanine crude pigment (β phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 2.6. 45 parts of tetrahydrofuran are then added, the mixture is stirred at the boiling temperature for 3 hours, and the tetrahydrofuran is then distilled off by heating to up to 100° C. at the head. After cooling to 60° C., the pigment preparation is filtered off with suction, washed with water and dried at 80° C.

This gives 15.8 parts of pigment preparation (β phase) which on incorporation in AM varnish produces coatings of high color strength.

EXAMPLE 16

A suspension comprising 85 parts of 5% aqueous isobutanol and 15 parts of coarse-crystalline copper phthalocyanine crude pigment (β phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 2.6. 45 parts of ethanolamine are then added and the mixture is stirred at the boiling temperature for 3 hours. After cooling to 60° C., the pigment preparation is filtered off with suction, washed with water and dried at 80° C.

This gives 15.0 parts of pigment preparation (β phase) which on incorporation in AM varnish produces coatings of high color strength. The rheology is given a rating of 3 to 4. The viscosity is 3.4 s, and the gloss measurement gives a value of 86. When used for offset printing, prints having high transparency and color strength are obtained. Flowability of the printing ink is very good.

EXAMPLE 17

A suspension comprising 90 parts of 5% aqueous isobutanol and 10 parts of coarse-crystalline copper phthalocyanine crude pigment (β phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 80 parts of water, and 0.25 part of the pigment dispersing agent of the formula (I) is added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 1.0. 0.1 part of dodecylbenzenesulfonic acid and 10 parts of isobutanol (100% pure) are then added and the mixture is stirred at the boiling temperature for 3 hours. The isobutanol is then distilled off by heating to up to 100° C. at the head. After cooling to 60° C., the pigment preparation is filtered off with suction, washed with water and dried at 80° C.

This gives 10. 2 parts of pigment preparation (β phase) which on incorporation in AM varnish produces coatings of high color strength.

EXAMPLE 18

A suspension comprising 85 parts of 5% aqueous isobutanol and 15 parts of coarse-crystalline nickel phthalocyanine crude pigment (97.2% pure) is metered into a stirred ball mill (manufacturer: Draiswerke GmbH, Mannheim) which is filled with 336 parts of zirconium mixed oxide beads 0.3 to 0. 4 mm in diameter as the grinding medium, and the mixture is milled at 25° C. and a peripheral speed of the stirrer of 15.6 m/s and a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment is filtered off with suction, washed with water and dried at 80° C.

This gives 14.9 parts of pigment. 9.5 parts of pigment are mechanically mixed with 0.5 part of the pigment dispersing agent of the formula (I). In this formula (I) P is the radical given in formula (II) in which Me is a copper atom and X is a phthalimidomethylene group (IIIh) in which $R^6$, $R^7$, $R^8$ and $R^9$ are each a hydrogen atom and m is the number 1.0. This gives a pigment preparation which on incorporation in AM varnish produces coatings of high color strength.

EXAMPLE 19

A suspension comprising 90 parts of 5% aqueous isobutanol and 10 parts of coarse-crystalline chlorine-containing copper phthalocyanine crude pigment (a phase, 98.2% pure, chlorine content 3.4%) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. at a peripheral speed of the stirrer of 15.6 m/s and a specific power density of 3.1 kW per liter of milling space for 5 minutes. The mill base suspension is then separated from the grinding medium by screening, the grinding medium is rinsed with water, and the combined mill base suspensions are filtered off with suction.

For the finishing operation, the press cake obtained on the filter is taken up in 80 parts of water. 10 parts of cyclohexanol (100% pure) are then added, the mixture is stirred at the boiling temperature for 3 hours, and the cyclohexanol is then distilled off by heating to up to 100° C. at the head. After cooling to 60° C., the pigment is filtered off with suction, washed with water and dried at 80° C.

This gives 9.9 parts of pigment (α phase). 9.5 parts of pigment are mechanically mixed with 0.5 part of the pigment dispersing agent of the formula (I). In this formula (I), P is the radical given in formula (II) in which Me is a copper atom and X is a phthalimidomethylene group of the formula (IIIh) in which $R^6$, $R^7$, $R^8$ and $R^9$ are each a hydrogen atom and m is the number 1.0. This gives a pigment preparation which on incorporation in AM varnish produces coatings of high color strength.

EXAMPLE 20

A suspension comprising 70 parts of 50% aqueous acetone and 30 parts of coarse-crystalline chlorine-containing copper phthalocyanine crude pigment (96.2% pure, chlorine content 48.0%) is metered into a stirred ball mill (manufacturer: Draiswerke GmbH, Mannheim) which is filled with 500 parts of zirconium mixed oxide beads 0.3 to 0.4 mm in diameter as the grinding medium, and the mixture is milled at 25° C. at a peripheral speed of the stirrer of 15.6 m/s at a specific power density of 3.1 kW per liter of milling space for 5 minutes. The mill base suspension is then separated off from the grinding medium by screening, the grinding medium is rinsed with water, and the combined mill base suspensions are filtered off with suction.

For the finishing operation, the press cake obtained on the filter is taken up in 240 parts of 50% aqueous acetone. The acetone is then distilled off by heating to up to 100° C. at the head. After cooling to 30° C., the pigment is filtered off with suction, washed with water and dried at 80° C.

This gives 28.9 parts of pigment. 9.9 parts of pigment are mechanically mixed with 0.1 part of the pigment dispersing agent of the formula (I). In this formula (I), P is the radical given in formula (II) in which Me is a copper atom and X is a phthalimidomethylene group of the formula (IIIh) in which $R^6$, $R^7$, $R^8$ and $R^9$ re each a hydrogen atom and m is the number 1.0. This gives a pigment preparation which on incorporation in AM varnish produces coatings of high color strength.

EXAMPLE 21

A suspension comprising 85 parts of 5% aqueous isobutanol and 15 parts of coarse-crystalline copper phthalocyanine crude pigment (a phase, 99% pure) is metered into a stirred ball mill (manufacturer: Draiswerke GmbH, Mannheim) which is filled with 336 parts of zirconium mixed oxide beads 0.3 to 0.4 Mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

Figure 2:
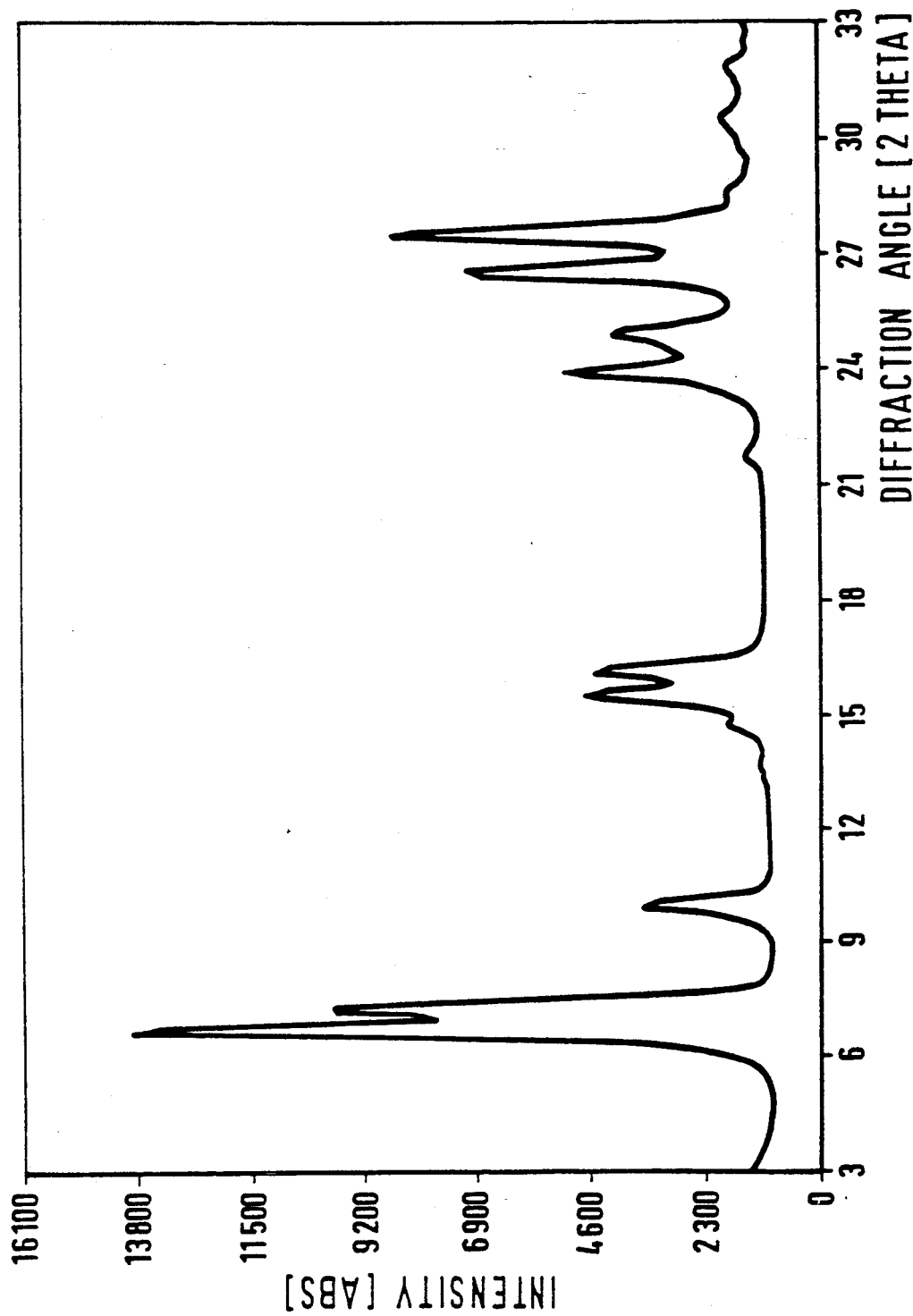
FIG. 2 shows the x-ray diffraction diagram of a copper phthalocyanine pigment preparation in the $\alpha$ phase obtained by Example 21 of the present invention.

For the finishing operation, the press cake obtained on the filter is taken up in 120 parts of water and 1.5 parts of the pigment dispersing agent of the formula (I) is added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C. This gives 14.1 parts of pigment preparation ($\alpha$ phase, see FIG. 2) which on incorporation in AM varnish containing aromatics and application and baking at 140° C. of the pigmented material produces coatings of high color strength. The rheology is given a rating of 3. The viscosity is 5.0 s and evaluation of the gloss gives a value of 84. In this coating, the pigment preparation is present in the $\alpha$ phase.

Incorporation of PUR varnish gives transparent coatings of high color strength. The rheology is given a rating of 5.

If this pigment preparation is heated to boiling in accordance with the procedure of GB-A 1,502,884, Example 1, chlorobenzene being replaced by xylene, in a xylene/water mixture for 5 hours, the pigment preparation obtained after isolation is present, in contrast to the procedure given in the DE-A mentioned, not in the $\beta$ phase but surprisingly in the a phase.

COMPARATIVE EXAMPLE 21a

If the crude pigment used above is milled in a bead mill equipped with disk stirrer of the design according to U.S. Pat. No. 2,816,115, together with quartz beads 1 mm in diameter at a peripheral speed of the stirrer of 10.2 m/s and a specific power density of 0.45 kW per liter of milling space for 2 hours, the mill base having the abovementioned composition, and finished as described above, the pigment preparation obtained on incorporation in AM varnish has a 15% lower color strength and is significantly duller than the pigment preparation produced according to the invention.

EXAMPLE 22

A suspension comprising 85 parts of water and 15 parts of coarse-crystalline copper phthalocyanine crude pigment (a phase, 99% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium by screening, and the grinding medium is rinsed with water, the combined mill base suspensions are filtered off with suction.

For the finishing operation, the press cake obtained on the filter is taken up in 120 parts of water, and 1.5 parts of the pigment dispersing agent of the formula (i) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is the number 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 15.9 parts of pigment preparation ($\alpha$ phase) which on incorporation in AM and TSA varnish produces coatings of high color strength. When used for nitrocellulose gravure printing, prints of high color strength are obtained.

EXAMPLE 23

A suspension comprising 85 parts of 5% aqueous isobutanol and 15 parts of coarse-crystalline copper phthalocyanine crude pigment (a phase, 99% pure) is metered into a stirred ball mill (manufacturer: Draiswerke GmbH, Xannheim) which is filled with 336 parts of zirconium mixed oxide beads 0.3 to 0.4 mm in diameter as the grinding medium, and the mixture is then milled at 25° C. and a peripheral speed of the stirrer of 15.6 m/s at a specific power density of 3.1 kW per liter of milling space for 30 minutes. The mill base suspension is then separated from the grinding medium by screening, the grinding medium is rinsed with water, and the combined mill base suspensions are filtered off with suction.

For the finishing operation, the press cake obtained on the filter is taken up in 120 parts of water. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment is filtered off with suction, washed with water and dried at 80° C.

This gives 14.9 parts of pigment ($\alpha$ phase) which on incorporation in plastic (PVC) gives pigmentations of high color strength.

EXAMPLE 23a 9.0 parts of the pigment prepared according to Example 23 are mechanically mixed with 1.0 part of the pigment dispersing agent of the formula (I). In formula (I) P is the radical given in formula (II) in which Me is a copper atom and in which X is a group of the formula (IIIf) in which A is an imidazolyl radical, $R^{30}$ is a methyl group, $R^4$ and $R^5$ are each a hydrogen atom and m is the number 1.0. The pigment dispersing agent still contains 40% of unsubstituted copper phthalocyanine.

This gives a pigment preparation which on incorporation in TSA varnish produces coatings of high color strength.

EXAMPLE 24

A suspension comprising 90 parts of water and 10 parts of coarse-crystalline copper phthalocyanine crude pigment (a phase, 99% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 10 minutes. The mill base suspension is then separated from the grinding medium by screening, the grinding medium is rinsed with water, and the combined mill base suspensions are filtered off with suction.

For the finishing operation, the press cake obtained on the filter is taken up in 80 parts of water, and 1.0 part of the pigment dispersing agent of the formula (I) is added as a 15.0% water-moist press cake. In formula (I), P is the radical given in formula (II) in which Me is a copper atom and in which X is a group of the formula (IIIf) in which A is an imidazolyl radical, $R^{30}$ is a methyl group, $R^4$ and $R^5$ are each a hydrogen atom and m is the number 1.0. The pigment dispersing agent still contains 40% of unsubstituted copper phthalocyanine. 30 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 9.2 parts of pigment preparation (α phase) which on incorporation in AM varnish produces coatings of high color strength.

What is claimed is:

1. A process for the production of a phthalocyanine pigment or a pigment preparation based on a phthalocyanine pigment, which comprises
   a) first wet milling a crude phthalocyanine pigment in an inert liquid medium in a stirred ball mill which is operated at a power density of more than 2.5 kW per liter of milling space and a peripheral speed of the stirrer of more than 12 m/s with exposure to a grinding medium having a diameter of less than 1 mm under phase-conserving conditions, thus producing a prepigment composition, then
   b) subjecting the prepigment composition obtained by a) either
   b1) in the form of the mill base suspension thus obtained, or
   b2) in the case where the prepigment intermediate or the prepigment composition intermediate is isolated, after first taking it up in an organic solvent, to a finishing treatment at elevated temperature, and
   c) then isolating the resulting pigment or pigment preparation.

2. The process as claimed in claim 1, wherein there is added one or more times, before during or after one or more of the individual steps a), b) and c), at least one pigment dispersing agent of the formula (I), $$P—X_m \quad (I)$$

in which

P is an m-valent radical based on the formula (II)

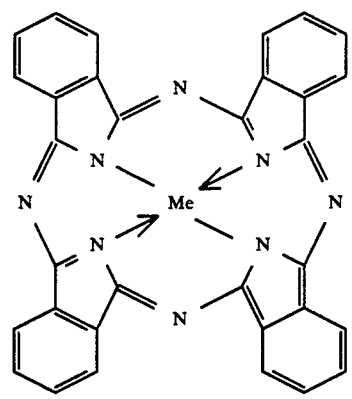

in which m is from 1 to 6

Me is two hydrogen atoms or a divalent metal atom, and

X is a group of the formula (IIIa)

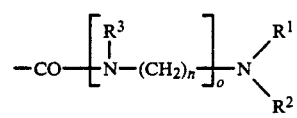

or a group of the formula (IIIb)

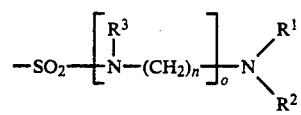

in which M is a hydrogen atom or an equivalent of an alkali metal ion, alkaline earth metal ion or ammonium ion or in which X is a group of the formula (IIIc)

$$-CO-\left[\begin{array}{c}R^3\\|\\N-(CH_2)_n\end{array}\right]_o-N\begin{array}{c}R^1\\\diagup\\\diagdown\\R^2\end{array} \quad (IIIc)$$

or a group of the formula (IIId)

$$-SO_2-\left[\begin{array}{c}R^3\\|\\N-(CH_2)_n\end{array}\right]_o-N\begin{array}{c}R^1\\\diagup\\\diagdown\\R^2\end{array} \quad (IIId)$$

in which $R^1$ and $R^2$ are identical or different and are a hydrogen atom, a $C_1$–$C_{20}$-alkyl, $C_2$–$C_{20}$-alkenyl group or a $C_5$–$C_7$-cycloalkyl group, or in which $R^1$ and $R^2$ together with the adjacent nitrogen atom form an aliphatic or aromatic, five- or six-membered heterocyclic system having in each case 1 to 3 identical or different heteroatoms belonging to the ring selected from the series consisting of nitrogen, oxygen and sulfur, $R^3$ is a hydrogen atom or a $C_1$–$C_4$-alkyl group, n is from 1 to 6, o is 0 or 1, and m is from 1 to 4, or in which X is an aminomethylene group of the formula (IIIe)

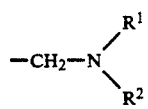 (IIIe)

in which $R^1$ and $R^2$ have the abovementioned meaning and m is from 1 to 6, or in which
X is a group of the formula (IIIf)

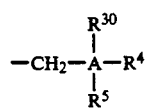 (IIIf)

in which A is a five- or six-membered aromatic ring or a fused aromatic heterocycle containing 1 to 3 identical or different heteroatoms selected from the series consisting of nitrogen, oxygen and sulfur and the heterocycle is bound to the methylene group via a carbon atom,
$R^{30}$ and $R^4$ are a hydrogen atom, a $C_1$-14 $C_4$-alkyl, a $C_2$-$C_4$-alkenyl or an aryl group, aryl being phenyl which is unsubstituted or substituted by 1 to 4 radicals selected from the group consisting of $C_1$-$C_6$-alkyl, halogen, $C_1$-$C_6$-alkoxy, cyano, $CONH_2$ and $COOR^{12}$, $R^{12}$ being hydrogen or $C_1$-$C_6$-alkyl, $R^{39}$ and $R^4$ together can also from an aliphatic or aromatic ring, $R^5$ is a hydrogen atom, a $C_1$-$C_4$-alkyl, a $C_1$-$C_3$-hydroxyalkyl or a $C_2$-$C_4$-alkenyl group and m is from 1 to 4, or in which
X is a group of the formula (IIIg)

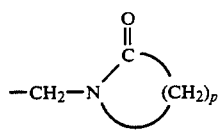 (IIIg)

p being from 3 to 6, and m being from 1 to 4, or
X is a phthalimidomethylene group of the formula (IIIh)

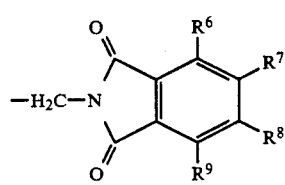 (IIIh)

in which $R^6$, $R^8$ and $R^9$ are identical or different and are a hydrogen, fluorine, chlorine or bromine atom,
$R^7$ is a hydrogen, fluorine, chlorine or bromine atom or a nitro, $C_1$-$C_5$-alkyl, $C_1$-$C_6$-alkoxy, or benzoylamino group and
m si from 1 to 4, or in which
X is an o-sulfobenzimidomethylene group of the formula (IIIi)

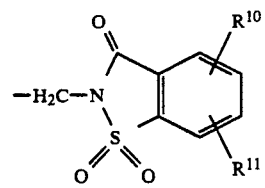 (IIIi)

in which $R^{10}$ and $R^{11}$ are identical or different and are a hydrogen, chlorine or bromine atom or a $C_1$-$C_4$-alkyl, $C_1$-$C_4$-alkoxy or a nitro group, and
m is form 1 to 4, or in which
X is a group of the formula (IIIk)

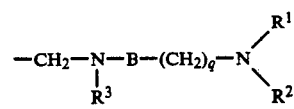 (IIIk)

in which B is a carbonyl or sulfonyl group, and $R^1$, $R^2$ and $R^3$ have the abovementioned meaning,
q is 1 or 2, and
m is from 1 to 4,
or there is added at least one pigment dispersing agent of the formula (I) containing variants of the abovementioned radicals X in one molecule.

3. The process as claimed in claim 1, wherein there is added one or more times, before, during or after one or more of the individual steps a), b) and c), at least one pigment dispersing agent of the formula (I);

$$P-X_m \qquad (I)$$

P is an m-valent radical based on the formula (II)

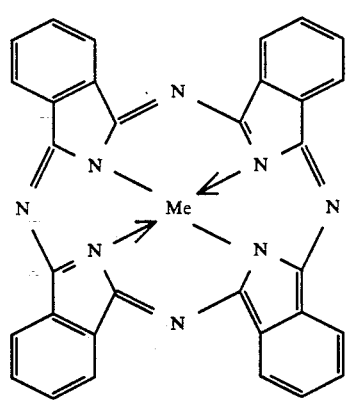 (II)

in which
m is from 1 to 6
Me is two hydrogen atoms or a copper, iron, zinc, nickel, cobalt or tin atom, and
X is a group of the formula (IIIa)

—COOM (IIIa)

or a group of the formula (IIIb)

—SO$_3$M (IIIb)

in which M is a hydrogen atom or an equivalent of an alkali metal ion, alkaline earth metal ion or ammonium ion or in which X is a group of the formula (IIIc)

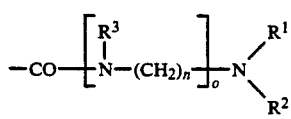
(IIIc)

or a group of the formula (IIId)

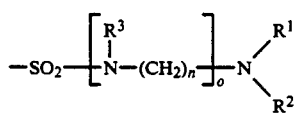
(IIId)

in which $R^1$ and $R^2$ are identical or different and are a hydrogen atom, a $C_1$–$C_{20}$-alkyl, $C_2$–$C_{20}$-alkenyl group or a $C_5$–$C_7$-cycloalkyl group, or in which $R^1$ and $R^2$ together with the adjacent nitrogen atom form an aliphatic or aromatic, five- or six-membered heterocyclic system having in each case 1 to 3 identical or different heteroatoms belonging to the ring selected from the series consisting of nitrogen, oxygen and sulfur, $R^3$ is a hydrogen atom or a $C_1$–$C_4$-alkyl group, n is from 1 to 6, o is 0 or 1, and m is from 1 to 4, or in which X is an aminomethylene group of the formula (IIIe)

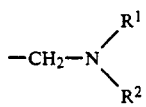
(IIIe)

in which $R^1$ and $R^2$ have the abovementioned meaning and m is from 1 to 6, or in which X is a group of the formula (IIIf)

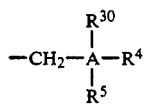
(IIIf)

in which A is a five- or six-membered aromatic ring or a fused aromatic heterocycle containing 1 to 3 identical or different heteroatoms selected from the series consisting of nitrogen, oxygen and sulfur and the heterocycle is bound to the methylene group via a carbon atom, $R^{30}$ and $R^4$ are a hydrogen atom, a $C_1$–$C_4$-alkyl, $C_2$–$C_4$-alkenyl or an aryl group, aryl being phenyl which is unsubstituted or substituted by 1 to 4 radicals selected from the group consisting of $C_1$–$C_6$-alkyl, F, Cl, Br, $C_1$–$C_6$-alkoxy, cyano, $CONH_2$ and $COOR^{12}$, $R^{12}$ being hydrogen or $C_1$–$C_6$-alkyl, $R^{30}$ and $R^4$ together optionally form an aliphatic or aromatic ring, $R^5$ is a hydrogen atom, a $C_1$–$C_4$-alkyl, a $C_1$–$C_3$-hydroxyalkyl or a $C_2$–$C_4$-alkenyl group and m is from 1 to 4, or in which X is a group of the formula (IIIg)

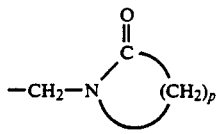
(IIIg)

p being from 3 to 6, and m being from 1 to 4, or

X is a phthalimidomethylene group of the formula (IIIh)

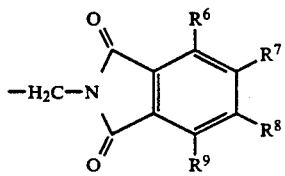
(IIIh)

in which $R^6$, $R^8$ and $R^9$ are identical or different and are a hydrogen, fluorine, chlorine or bromine atom, $R^7$ is a hydrogen, fluorine, chlorine or bromine atom or a nitro, $C_1$–$C_5$-alkyl, $C_1$–$C_6$-alkoxy, or benzoylamino group and m is from 1 to 4, or in which X is an o-sulfobenzimidomethylene group of the formula (IIIi)

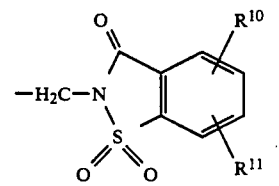
(IIIi)

in which $R^{10}$ and $R^{11}$ are identical or different and are a hydrogen, chlorine or bromine atom or a $C_1$–$C_4$-alkyl, $C_1$-14 $C_4$-alkoxy or a nitro group, and m is from 1 to 4, or in which X is a group of the formula (IIIk)

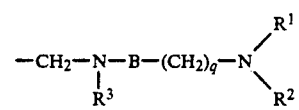
(IIIk)

in which B is a carbonyl or sulfonyl group, and $R^1$, $R^2$ and $R^3$ have the abovementioned meaning, q is 1 or 2, and m is from 1 to 4, or there is added at least one pigment dispersing agent of the formula (I) containing variants of the abovementioned radicals X in one molecule.

4. The process as claimed in claim 2, wherein Me is a copper atom.

5. The process as claimed in claim 1, wherein a grinding medium of diameter 0.2 to 1.0 mm is used.

6. The process as claimed in claim 1, wherein a grinding medium of diameter 0.3 to 0.5 mm is used.

7. The process as claimed in claim 1, wherein the ratio of milling space to surface area of the milling space in the stirred ball mill is less than 0.15:1 ($dm^3$:$dm^2$).

8. The process as claimed in claim 1, wherein the pigment concentration in the mill base suspension is at most 40% by weight.

9. The process as claimed in claim 1, wherein the pigment concentration in the mill base suspension is 10 to 35% by weight.

10. The process as claimed in claim 1, wherein the pigment concentration in the mill base suspension is 10 to 20% by weight.

11. The process as claimed in claim 1, wherein the inert liquid medium used during wet milling is water or an aqueous-organic medium.

12. The process as claimed in claim 1, wherein wet milling is carried out in a solution of a $C_1$-$C_8$-alkanol in water.

13. The process as claimed in claim 1, wherein wet milling is carried out in a solution of a butanol in water.

14. The process as claimed in claim 1, wherein a mixture of water and an organic solvent is used in the finishing treatment.

15. The process as claimed in claim 1, wherein a mixture of water and a $C_1$-$C_8$-alkanol is used in the finishing treatment.

16. The process as claimed in claim 1, wherein a mixture of water and a butanol is used in the finishing treatment.

17. The process as claimed in claim 1, wherein highly crystalline copper phthalocyanine crude pigments of the α phase or β phase, which may additionally contain small amounts of carboxyl or sulfonyl groups, are used.

18. The process as claimed in claim 1, wherein highly crystalline halogenated copper phthalocyanine crude pigments are used.

19. The process as claimed in claim 1, wherein at least one compound of the formula (I) in which X is a phthalimidomethylene group of the formula (IIIh)

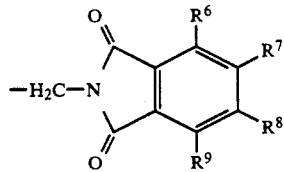

$R^6$, $R^7$, $R^8$ and $R^9$ being each a hydrogen atom and m being from 1 to 4, is used as the pigment dispersing agent.

20. The process as claimed in claim 1, wherein at least one compound of the formula (I) in which X is an o-sulfobenzimidomethylene group of the formula (IIIi)

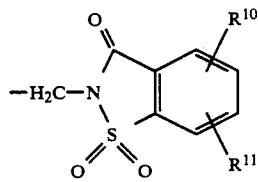

$R^{10}$ and $R^{11}$ being each a hydrogen atom and m being from 1 to 4, is used as the pigment dispersing agent.

21. The process as claimed in claim 1, wherein at least one compound of the formula (I) in which X is a group of the formula (IIIf)

in which A is an imidazole, triazole or pyrazole radical and the heterocycle mentioned is bound to the methylene group via a carbon atom, $R^{30}$ and $R^4$ are a hydrogen atom, a methyl, ethyl or $C_2H_4$-OH group or in which $R^{30}$ and $R^4$ together form a phenyl ring, $R^5$ is a hydrogen atom, a $C_1$-$C_4$-alkyl, $C_1$-$C_3$-hydroxylalkyl or a $C_2$-$C_4$-alkenyl group and m is from 1 to 4, is used as the pigment dispersing agent.

22. The process as claimed in claim 1, wherein at least one compound of the formula (I) in which X is a sulfonamido group of the formula (IIId)

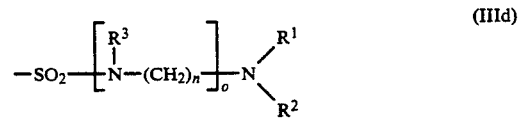

in which $R^1$ and $R^2$, independently of one another, are each a hydrogen atom, a methyl or ethyl group, or in which $R^1$ and $R^2$ together with the adjacent nitrogen atom form an imidazole, piperidine, piperazine, pyrrolidine, morpholine, imidazoline or hexamethyleneimine radical, $R^3$ is a hydrogen atom or a $C_1$-$C_4$-alkyl group n is 2 or 3, o is 1 and m is from of 1 to 4, is used as the pigment dispersing agent.

23. The process as claimed in claim 1, wherein a mixture of different pigment dispersing agents of the formula (I) is used.

24. The process as claimed in claim 1, wherein the pigment dispersing agents of the formula (I) are present in amounts of 0.1 to 25% by weight, relative to the phthalocyanine pigment used.

25. The process as claimed in claim 1, wherein the pigment dispersing agents of the formula (I) are present in amounts of 1 to 15% by weight, relative to the phthalocyanine pigment used.

26. The process as claimed in claim 1, wherein the pigment dispersing agents of the formula (I) are present in amounts of 3 to 10% by weight, relative to the phthalocyanine pigment used.

27. A pigment preparation obtained by the process as claimed in claim 1.

28. A method of pigmenting a varnish, a printing ink or a plastic, comprising the step of incorporating a pigment preparation as claimed in claim 1 into said varnish, printing ink or plastic.

* * * * *

UNITED STATES PATENT AND TRADEMARK OFFICE
CERTIFICATE OF CORRECTION

PATENT NO. : 5,296,033
DATED : March 22, 1994
INVENTOR(S) : Deitz, et. al.

It is certified that error appears in the above-indentified patent and that said Letters Patent is hereby corrected as shown below:

In claim 2, column 25, line 25, the term "$C_1$-14 $C_4$" should read --$C_1$-$C_4$--.

In claim 2, column 25, line 31, "$R^{39}$" should read --$R^{30}$--.

In claim 2, column 25, line 66, the word "si" should read --is--.

In claim 3, column 28, line 41, the term "$C_1$-14 $C_4$" should read --$C_1$-$C_4$--.

Signed and Sealed this

Ninth Day of August, 1994

Attest:

BRUCE LEHMAN

*Attesting Officer*　　　*Commissioner of Patents and Trademarks*